(12) United States Patent
Piot et al.

(10) Patent No.: US 7,696,980 B1
(45) Date of Patent: Apr. 13, 2010

(54) POINTING DEVICE FOR USE IN AIR WITH IMPROVED CURSOR CONTROL AND BATTERY LIFE

(75) Inventors: Julien Piot, Rolle (CH); Olivier Egloff, Renens (CH); Simone Arrigo, Ticino (CH); Lucas Gattoni, Geneva (CH); Nicolas Ramond, Lugrin (FR); David Tarongi Vanrell, Romanel-sur-Lausanne (CH)

(73) Assignee: Logitech Europe S.A., Romanel-sur-Morges (CH)

( * ) Notice: Subject to any disclaimer, the term of this patent is extended or adjusted under 35 U.S.C. 154(b) by 723 days.

(21) Appl. No.: 11/455,230

(22) Filed: Jun. 16, 2006

(51) Int. Cl.
*G06F 3/033* (2006.01)
*G09G 5/08* (2006.01)

(52) U.S. Cl. ................................. 345/157; 345/159

(58) Field of Classification Search .......... 345/156–160
See application file for complete search history.

(56) References Cited

U.S. PATENT DOCUMENTS

| | | | |
|---|---|---|---|
| 4,578,674 A | | 3/1986 | Baker et al. |
| 4,796,019 A | | 1/1989 | Auerbach |
| 5,124,689 A | * | 6/1992 | Franz et al. ................. 345/160 |
| 5,363,120 A | | 11/1994 | Drumm |
| 5,440,326 A | | 8/1995 | Quinn |
| 5,448,261 A | | 9/1995 | Koike et al. |
| 5,543,758 A | | 8/1996 | Wey |
| 5,554,980 A | | 9/1996 | Hashimoto |
| 5,673,066 A | * | 9/1997 | Toda et al. .................. 345/157 |
| 5,764,219 A | * | 6/1998 | Rutledge et al. ............ 345/159 |
| 5,825,350 A | | 10/1998 | Case, Jr. et al. |
| 5,898,421 A | | 4/1999 | Quinn |
| 5,963,145 A | | 10/1999 | Escobosa |
| 6,069,594 A | | 5/2000 | Barnes et al. |
| 6,104,380 A | | 8/2000 | Stork et al. |
| 6,147,677 A | | 11/2000 | Escobosa et al. |
| 6,603,420 B1 | | 8/2003 | Lu |
| 6,661,410 B2 | * | 12/2003 | Casebolt et al. ............. 345/173 |
| 6,721,831 B1 | | 4/2004 | Lee |
| 6,750,801 B2 | | 6/2004 | Stefanik |
| 2002/0095317 A1 | | 7/2002 | McCabe |
| 2004/0090423 A1 | | 5/2004 | Bissett |
| 2004/0218104 A1 | | 11/2004 | Smith et al. |
| 2005/9078087 | | 4/2005 | Gates et al. |

OTHER PUBLICATIONS

Margopoulos, W.P.; "Correction of Drift in Rotating Apparatus"; 1958, *IBM Technical Disclosure Bulletin*, vol. 34, No. 11, 2 pages.

* cited by examiner

*Primary Examiner*—Bipin Shalwala
*Assistant Examiner*—Ilana Spar
(74) *Attorney, Agent, or Firm*—Townsend and Townsend and Crew, LLP

(57) ABSTRACT

One aspect of the present invention is an apparatus and method for improved cursor control in a device which can operate both on a work surface and in air. Cursor resolution is reduced as the user engages with the device for clicking, leading to more precise movement closer to the target, as well as reduced parasitic and other unintentional motion of the cursor during clicking. Moreover, one aspect of the present invention is an apparatus and method for improved battery life in an in-air pointing device. In another aspect, the present invention is a method a system for improved user interface interaction, for UI controls such as sliders, pop-up boxes, menus, lists and button groups.

4 Claims, 11 Drawing Sheets

POINTING DEVICE FOR USE IN AIR WITH IMPROVED CURSOR CONTROL AND BATTERY LIFE

CROSS-REFERENCES TO RELATED APPLICATIONS

This application is related to co-pending application Ser. No. 11/356,386 entitled "Dead Front Mouse" which was filed on Feb. 16, 2006, which is hereby incorporated herein in its entirety.

BACKGROUND OF THE INVENTION

1. Field of the Invention

The invention relates generally to input devices, and more particularly, to improving handling and battery life of a mouse which can also be used in-air.

2. Description of the Related Art

The personal computer (PC) is increasingly becoming a media center, which users use to store and play music, videos, pictures, etc. As a result, the PC is also increasingly seen in the living room. Users are often in more relaxed positions (e.g., lounging on a couch) when in the living room, or more generally, when interacting with media (such as when watching a video), than when using the PC for more traditional interactions. Apart from being in a more relaxed position, the user is often not close enough to a desk to rest a mouse on it.

Use of pointing devices such as mice or trackballs with a PC has become ubiquitous. At least for the reasons discussed above, such input devices which can only function when placed on a work surface (e.g., a desk or a mouse pad) are not optimal for use in such environments. Some attempts have been made at creating input devices which work freely in the air, and also work as more traditional input devices when placed on a surface. The most intuitive interface is to map the system orientation changes (e.g., yaw and pitch) into x and y cursor displacements. FIG. 1, from Logitech U.S. Pat. No. 6,069,594, illustrates yaw, pitch and roll. Some available "in-air" devices measure the changes in these orientations (yaw, pitch, and/or roll) when the user moves the device, and use these to change the position of a cursor appearing on a computer screen or media player screen. For example, the cursor on the screen moves by an amount that is a function of the yaw and pitch change. In its simplest form, the cursor position change is proportional to the orientation angle change, for example 20 pixels cursor movement results from a 1° angle change or increment. In some available devices, yaw controls the x-coordinate and pitch controls the y-coordinate. More elaborate methods, not described here, apply some non linear function on the estimated yaw, pitch, and/or roll.

Several patents and publications describe detection of movement in 3D and/or detection of movement in air, and using this detected movement to control cursor movement on an associated display. U.S. Pat. No. 5,543,758 describes a remote control that operates by detecting movement of the remote control in space including detecting circular motions and the like. U.S. Pat. No. 6,104,380 describes a control device for controlling the position of a pointer on a display based on motion detected by a movement sensor. U.S. Pat. No. 5,554,980 describes a mouse that detects 3D movement for controlling a cursor on a display. U.S. Pat. No. 5,363,120 claims a system and a method for a computer input device configured to sense angular orientation about a vertical axis. The detected orientation is used to control a cursor position on a screen. U.S. Pat. No. 4,578,674 shows a wireless (ultrasonic) pointer that can also be operated in 3 dimensions. Also, U.S. Pat. No. 4,796,019 shows a wireless handheld pointer to control a cursor by changing angular position using multiple radiation beams. IBM Technical Disclosure Bulletin Vol. 34, No. 11 describes a Gyroscopic Mouse Device that includes a gyroscope that is configured to detect any movement of a mouse to control a cursor on a display. U.S. Pat. No. 5,898,421 describes a gyroscopic mouse method that includes sensing an inertial response associated with mouse movement in 3D-space. U.S. Pat. No. 5,440,326 describes a gyroscopic mouse configured to detect mouse movement in 3D-space, such as pitch and yaw. U.S. Pat. No. 5,825,350 describes a gyroscopic mouse configured to detect mouse movement in 3D-space. U.S. Pat. No. 5,448,261 describes a mouse configured to move in 3D space. U.S. Pat. No. 5,963,145, U.S. Pat. No. 6,147,677, and U.S. Pat. No. 6,721,831 also discuss remote control orientation. U.S. Pat. No. 6,069,594 shows a mouse that moves in 3 dimensions with 3 ultrasonic, triangulating sensors around the display. U.S. Published Application 20050078087 is directed to a device which acts as a mouse for a PC when on a surface, detects when it is lifted, then acts as a remote control for appliances. U.S. Published Application 20022040095317 also discloses a remote control that can be used to control a television and a computer system.

However, known pointing devices that work "in-air" present several challenges. For instance, clicking at a specific desired location (e.g., on an icon on a display associated with the computer) is difficult when maneuvering the pointing device in air. Further, since such devices work both when resting on a surface (e.g., like a conventional mouse) as well as in air there needs to be some way to figure out whether the device is operating on a surface or in air. Moreover, a device which operates in air may be subject to significant ongoing battery consumption in certain scenarios, such as if the user were to continually hold the device in his hand while watching a movie. Furthermore, easy and intuitive user interfaces are not available in in-air input devices for computers, such as for controlling volume and so on. Each of these is discussed in some detail below.

A fundamental requirement of a pointing device is the point-and-click mechanism—for example, clicking on an icon on a display associated with the computer. The cursor is moved until it reaches the icon and then the user clicks upon it to trigger some action. Other functionality typically associated with such pointing devices includes drag-and-drop. Here an object is selected by clicking a button on the pointing device while the cursor is positioned on the object, moved while the button is maintained pushed, and then dropped by releasing the button when the destination has been reached. Clicking at a precise location with an in-air device is problematic. To begin with, controlling the movement of the cursor accurately is difficult because holding the device in the air makes complete control of orientations difficult. Further, changes in the device orientation and/or location will, by design move the cursor, and so will the parasitic motion generated by the hand when clicking. Typically, such parasitic motion results in a missed click (the operating system suppresses click when the cursor is not steady over its target or when the cursor is no longer on the icon at button release). Moreover, there is an inherent trade-off in free-space devices—given the limited angle span of a human wrist, a large resolution is needed in order for the user to easily reach the entire screen with a single wrist movement; however having too large a resolution would result in random cursor movements attributable to normal tremor of human hands and parasitic clicking motion.

Moreover, as mentioned above, there needs to be some way for the pointing device to know whether it is working in air, or on a surface, since cursor control is generally implemented differently in these two modes.

Some existing solutions, such as the one from Thomson's Gyration Inc. (Saratoga, Calif.), require the user's to take a specific action each time when he wants the device to operate in air. For example, a specific button (trigger) may be used, the state of which can indicate whether to make the in-air tracking mechanism active. However, such solutions are cumbersome to the user, since they require continual added actions (pressing and releasing the trigger button) from the user. The user cannot just pick up the device from the table and seamlessly continue to use it.

The solutions mentioned above address the problem of clicking in a specific location by simply exiting the in-air cursor control mode when clicking any buttons. When a user wants to click in a specific location, he simply releases the trigger button mentioned above, so that the movement of the device in air no longer translates into cursor movement. He then clicks on the button, thus eliminating any parasitic motion problems. The user will then have to click on the trigger button again to enter in-air cursor control mode to continue moving the cursor in air. Such pre-existing solutions result in a cumbersome, complicated and non-intuitive interaction of the user with the user interface.

Existing devices also suffer from the reduced battery life that results from moving the device unintentionally over an extended period of time, for example by holding the device while watching a movie or listening to music. Once again, existing system address this problem by requiring a trigger button to be pressed for the device to enter the in-air mode. When the trigger button is not pressed battery power is not consumed even if the device is moved around unintentionally in air. However, such a trigger button makes the system less intuitive to use.

Easy and intuitive interactions with the user interface (UI) on the display associated with the computer are very important. In the case of pointing devices that operate only on a surface, some user interfaces exist which permit such interactions.

Some such user interfaces exist even in the case of devices operating in air. U.S. Pat. No. 6,603,420 describes using movement of a remote control to control volume or the channel. This patent describes movement of the remote control device in a first plane controlling a first controlled parameter, e.g., receiver volume, while movement of the remote control device in a second plane perpendicular to the first plane controls a second parameter, e.g., channel selection. U.S. Pat. No. 6,750,801, discloses a tilt sensor in a remote control by which, depending on the angle and orientation of the tilt, different electronic devices can be selected for control (for example, tilt left selects the TV, tilt right selects the VCR). U.S. Pat. No. 4,796,019 discusses basic gesture of moving up and down, side to side, and tilting. U.S. Pat. No. 5,448,261 discusses using the position of a remote control to control cursor position. To change channel, the cursor is put on a channel number in a two dimensional grid. To change volume, the cursor is placed on a volume bar and moved. U.S. Publication No. 2004-0090423 describes a remote control which has a pointing device (e.g., touchpad, trackball, joystick) which can detect movement up and down on the pointing device to select menu items on a screen, and side to side to select a value for an item. However, none of these patents or publications provides an air-scroller type of mechanism. Further, none of these patents or publications provides the user with feedback regarding the desired action being taken, without the user attentively looking to the screen until the desired position is reached.

US Published Application 2004-218104 describes a remote control with a user interface which permits the user to select channels and quickly navigate a dense menu of options. As mentioned above, this publication also does not discuss providing the user with feedback regarding the desired action being taken, without the user attentively looking to the screen until the desired position is reached. Given the device is also used for media application, where the user is in a lean-back posture, precise positioning using visual feedback is cumbersome. This applies to the user's interaction with sliders, list boxes, pop-up menus, button groups, etc. as well.

There is thus a need for an easy to use pointing device that can seamlessly transition from working on a surface to working in free-space. Further, there is need for an in-air pointing device which can facilitate clicking at a desired location in an easy and intuitive manner. Moreover, there is a need for a non-cumbersome in-air pointing device which conserves battery life. Furthermore, there is need for an in-air pointing device with improved user interface interaction.

BRIEF SUMMARY OF THE INVENTION

The present invention is an apparatus and method for improved cursor control in a device which can operate both on a work surface and in air. Cursor resolution is reduced as the user engages with the device for clicking, leading to more precise movement closer to the target, as well as reduced parasitic and other unintentional motion of the cursor during clicking. Moreover, one aspect of the present invention is an apparatus and method for improved battery life in an in-air pointing device. In another aspect, the present invention is a method a system for improved user interface interaction, for UI controls such as sliders, pop-up boxes, menus, lists and button groups.

A device in accordance with an embodiment of this invention improves cursor control by allowing the user to momentarily reduce the resolution when more precision is needed. Large resolution is needed to reach the desired zone on the screen (e.g., to make sure that the entire screen can be reached with a comfortable wrist movement). When the target zone is reached, the user can change the system behavior and make it more precise by reducing the resolution in a progressive way. This is done until the (small) target is reached. Eventually, the resolution gets back to its nominal (high) value.

In one embodiment, the change in resolution is based upon the presence of a user's finger on a smart button, and/or on the pressure exerted by the user's finger on the smart button. The smart button includes, in one embodiment, a touchpad which detects the presence of a user's finger as well as the pressure exerted by that finger. The system measures the touchpad pressure. When the pressure is above a predefined value, the resolution is decreased in direct proportion to the applied pressure (pressure*resolution=constant). In one embodiment, eventually, when a very large pressure is detected (e.g., above a predefined threshold), the cursor is frozen, allowing for a skating equivalent (e.g., the hand can be moved to a more relaxed position without moving the cursor), when the position is reached, pressure is lowered and the cursor moves again from where it was before the hand was repositioned. In another embodiment, when a very large pressure is detected, the cursor resolution is minimized, but is not frozen, thus allowing for operations such as drag and drop. Such embodiments reduce or eliminate parasitic cursor motion at click instant. It should be noted that these enhancements can be applied equally well to an "on-desk" mouse.

In one embodiment, a User Interface (UI) slider is controlled more easily by applying pulse feedback. In the slider control mode, when either the yaw or pitch angle has changed by a predefined quantity (angular increment), a feedback pulse is applied to alert the user that the corresponding slider position has been incremented and a notification is sent to the host, thus alleviating the need to carefully watch for the screen while controlling the slider position. The choice of whether yaw (x-axis) or pitch angle (y-axis) increments are used depends on the slider orientation. In one embodiment, this is defined by the application: a horizontal slider feedback pulse is controller by a yaw angular increment and the vertical slider feedback pulse is controlled by a pitch angular increment. As in Microsoft Windows from Microsoft Corp. (Redmond, Wash.), in one embodiment, the active UI control is the control on which the cursor is located, dedicated buttons allow to directly select the application containing that control without having to look at the cursor to position it on the desired application. An air-control type of button is linked, in one embodiment, to a dedicated UI. For instance, pressing a button dedicated to volume will, in one embodiment, bring up the volume control on a display as well as increasing the sound volume. In this example, moving the device down decreases the volume, and moving it up increases the volume, while providing the user with a autonomous feedback separate from the visual feedback on the screen. The above can be applied equally well to other UI controls such as to list box, pop-up menu, or button group.

In one embodiment of the present invention, extended battery life is obtained by relying on an inclinometer that monitors the system inclination at a specified polling rate. Let us assume the device is initially in idle state. When the system detects meaningful orientation change (for example larger than 10°) the system is categorized as active for certain duration (for example 10 sec). If no meaningful orientation change is detected during a defined time window, the system is categorized as idle. When in idle, the same inclination monitoring happens except it happens at a lower polling rate. Some power hungry blocks, for example those that determine cursor movement, a LED block indicating of air tracking, or a RF transmitter block, are also disabled while in idle. By reducing the polling rate when in idle and disabling some blocks, battery consumption is largely reduced. When a meaningful inclination change is detected, the system goes back in an active state where the nominal polling rate is applied and all blocks are activated, including the LED block that indicates the system is ready to track.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

The invention has other advantages and features which will be more readily apparent from the following detailed description of the invention and the appended claims, when taken in conjunction with the accompanying drawing, in which:

DETAILED DESCRIPTION OF THE INVENTION

The figures (or drawings) depict a preferred embodiment of the present invention for purposes of illustration only. It is noted that similar or like reference numbers in the figures may indicate similar or like functionality. One of skill in the art will readily recognize from the following discussion that alternative embodiments of the structures and methods disclosed herein may be employed without departing from the principles of the invention(s) herein.

Figure 1:
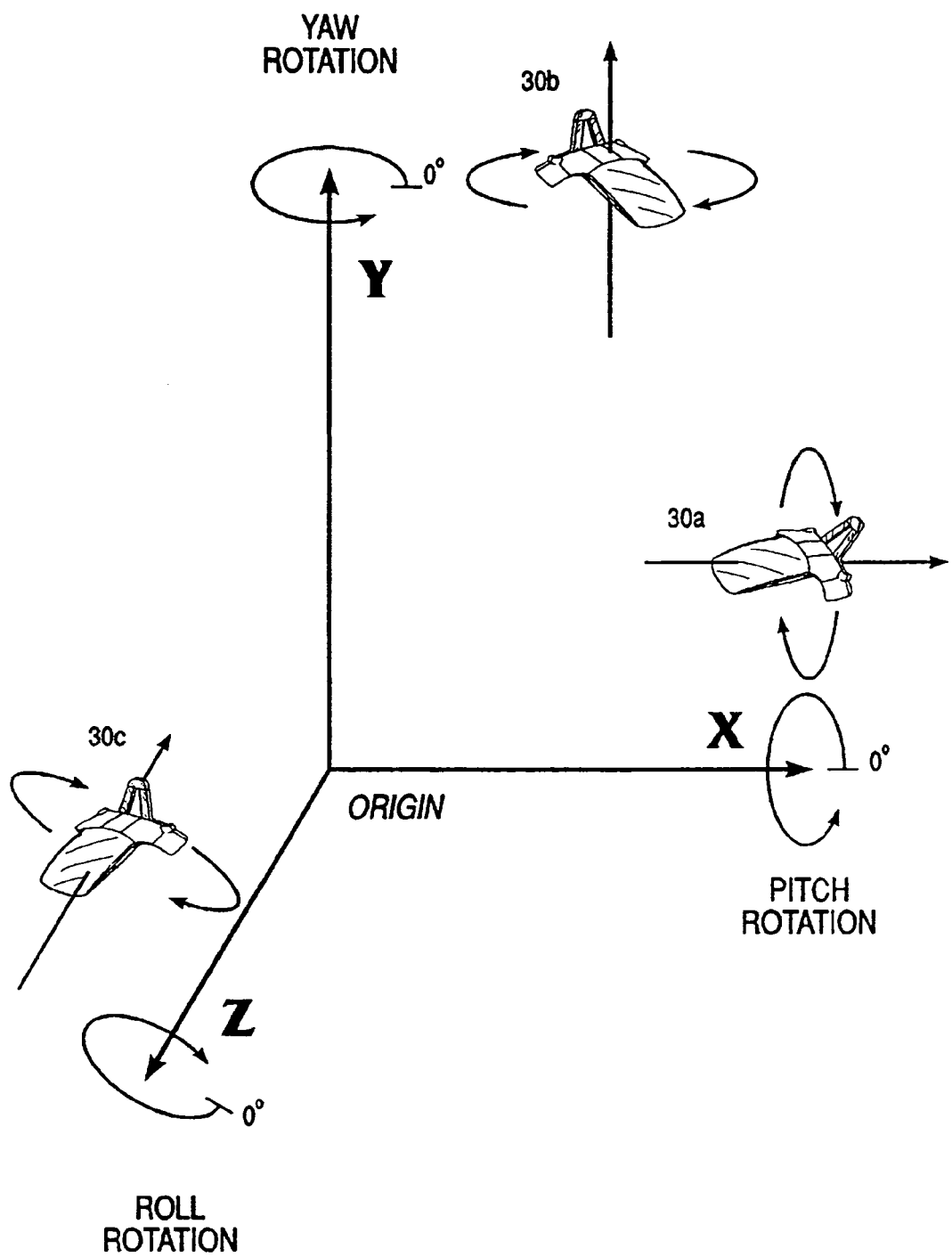
FIG. 1 is an illustration of yaw, pitch and roll.
Figure 2:
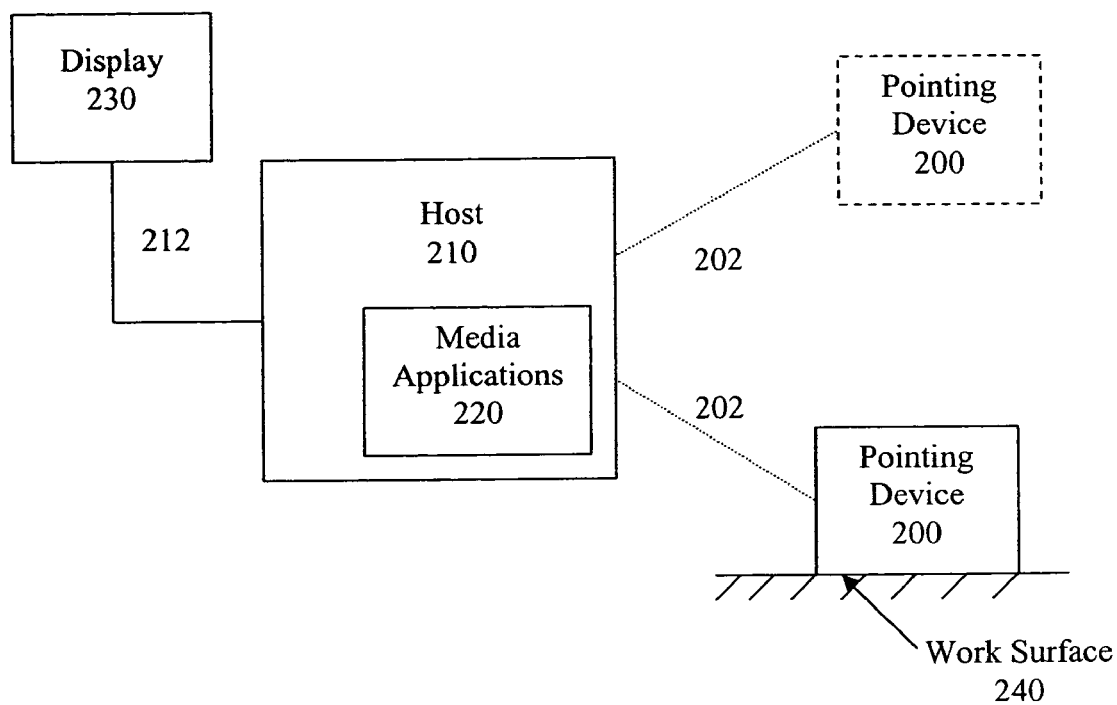
FIG. 2 is a block diagram of a system in accordance with an embodiment of the present invention.

FIG. 2 is a block diagram of a pointing device 200 used with a host system 210 with media applications 220, an associated display 230.

The pointing device 200 is a device in accordance with an embodiment of the present invention. It functions as a conventional pointing device (e.g., mouse) when placed on a work surface 240. In addition, it functions as an in-air pointing device when the user lifts it away from work surface 240. This transition from work surface mode to in-air mode is completely seamless for the user.

The host system 210 is a conventional computer system, that may include a computer, a storage device, a network services connection, and conventional input/output devices such as a mouse, a printer, and/or a keyboard, that may couple to a computer system. The computer also includes a conventional operating system, an input/output device, and network services software. In addition, in some embodiments, the computer includes Instant Messaging (IM) software for communicating with an IM service. The network service connection includes those hardware and software components that allow for connecting to a conventional network service. For example, the network service connection may include a connection to a telecommunications line (e.g., a dial-up, digital subscriber line ("DSL"), a T1, or a T3 communication line). The host computer, the storage device, and the network services connection, may be available from, for example, IBM Corporation (Armonk, N.Y.), Sun Microsystems, Inc. (Palo Alto, Calif.), or Hewlett-Packard, Inc. (Palo Alto, Calif.). It is to be noted that the host system 210 could be any other type of host system such as a PDA, a cell-phone, a gaming console, a media center PC, or any other device with appropriate processing power.

The host system 210 includes media applications 220. Examples of such a media application are iTunes from Apple Computer, Inc. (Cupertino, Calif.), and Media Player or Media Center from Microsoft Corp. (Redmond, Wash.). In one embodiment, the media applications 220 are not residing on the host system 210, but rather on a remote server. The host system 210 communicates with these media applications on the remote server via a network connection.

In one embodiment, the display 230 is part of the host system 210. In another embodiment, the display 230 can be a separate monitor. Such a separate monitor can be available, for example, from Sony Corp. (Japan), or Royal Philips Electronics (the Netherlands).

In one embodiment, the connections 202 from the pointing device 200 to the host system 210 are wireless. Such wireless connections can use any wireless technology, such as Blue-Tooth, RF, IR, etc. In one embodiment, the connections 202 from the pointing device 200 to the host system 210 are wired. Further, in one embodiment, the connections 202 are bidirectional. In another embodiment, the connections 202 are unidirectional. Similarly, connection 212 between the host system 210 and the display 230 can also be wired or wireless in different embodiments. In other embodiment, the display 230 is integrated into the host system 210 (e.g., in the case of a laptop).

The work surface 240 can be any surface on which the pointing device 210 can move. The displacement of the pointing device 200 on the work surface 240 is measured, and translated into cursor displacement on the associated display 230. The work surface 240 can be conventional surfaces such as tables, mouse pads, etc. The work surface 240 can also be less conventional surfaces such as a couch, the arm of a chair, etc. Further, the work surface 240 can be made of glass or other translucent surfaces.

Figure 3:
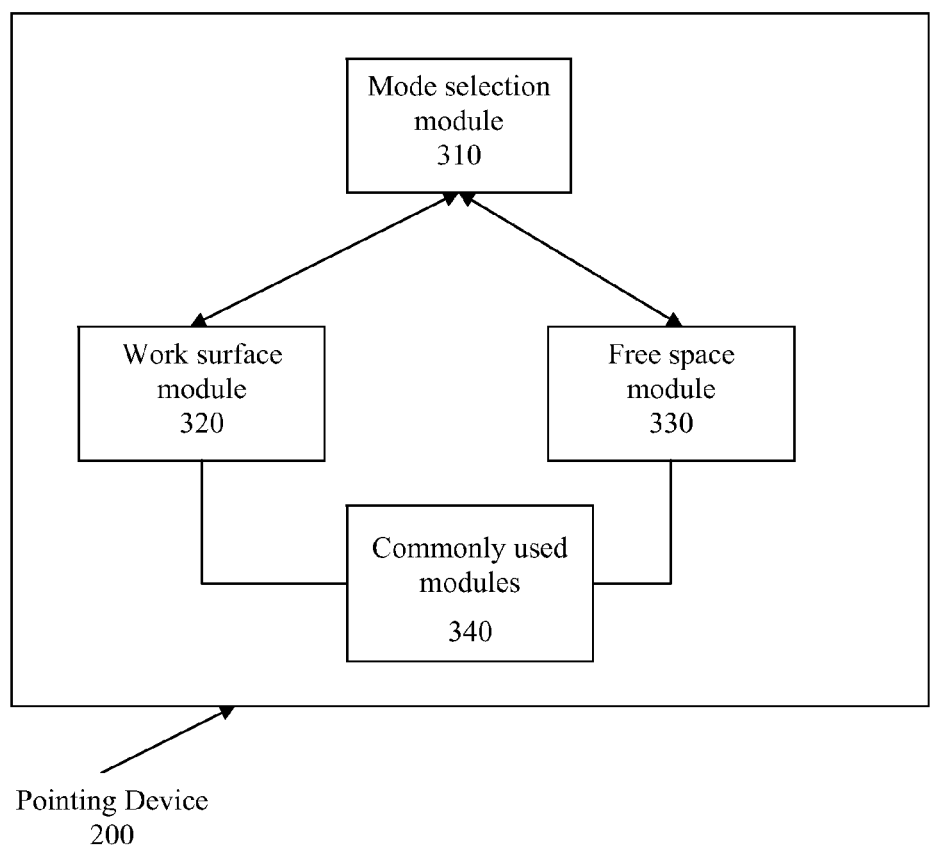
FIG. 3 is a block diagram illustrating a pointing device in accordance with an embodiment of the present invention.

FIG. 3 is a block diagram illustrating the pointing device 200 in some detail. The pointing device 200 includes a mode selection module 310, a work surface mode module 320, and an in-air mode module 330. In addition, modules that are commonly used 340 by the work surface mode module 310 and the in-air mode module 330 are also included.

The mode selection module 310 determines whether or not the pointing device 200 is resting on the work surface 240. If a determination is made that the pointing device 200 is resting on the work surface, the work surface module is activated 320. If a determination is made that the pointing device 200 is not resting on the work surface 240, the in-air module is activated 330. The functioning of these various modules is discussed in further detail below.

In one embodiment, the mode selection module 310 employs a lift detection algorithm. It will be obvious to one of skill in the art that one of various lift detection algorithms can be used here. In one embodiment, a mechanical plunger or switch is included, which moves downward due to gravity when the pointing device 200 is lifted. In other embodiments, changes in the readings of an optical sensor (e.g., suddenly finding that the pixel readings no longer match the expected response when reflections from the surface are present) indicate that the optical device 200 is no longer resting on the work surface.

The work surface module 320 includes the components in a conventional mouse. In one embodiment, the work surface module 320 measures displacement on the work surface 240 using optical techniques. In such embodiments, the work surface module 320 includes a light source (e.g., LED or laser), an optical sensor (e.g., based on edge detection techniques or correlation techniques), and often an illumination lens and an imaging lens. In one embodiment, the work surface module 320 measures displacement on the work surface 240 by measuring rotation of a ball. In such embodiments, a ball capable of rotating when in contact with the work surface 240 is included, along with a rotational encoder.

The in-air module 330 is described in more detail below with reference to FIG. 4. The commonly used modules 340 include several components in the pointing device 200 which are used by both the work surface module 320 as well as the in-air module 330. These components can include, for example, the battery used for powering the pointing device 200, a wireless transceiver, a microprocessor, a scroller wheel, a touch sensitive scroller and so on. It is to be noted that even apart from the commonly used modules 340, some components can be used for more than one module. For instance, an optical sensor used in the works surface module 320 can also be used for lift detection techniques used by the mode selection module 310.

It is to be noted that in one embodiment, certain controls (such as buttons) on the device 200 are only visible in one of the work surface mode or the in-air mode. For instance, certain buttons may be equipped with one or more LEDs, which light up when the device 200 enters the in-air mode. Only then do these buttons become visible. This prevents cluttering of the device 200 with too many buttons in either mode, and thus reduces user confusion. This is described in greater detail in co-pending application Ser. No. 11/356,386, entitled "Dead Front Mouse" which is hereby incorporated by reference in its entirety.

Figure 4:
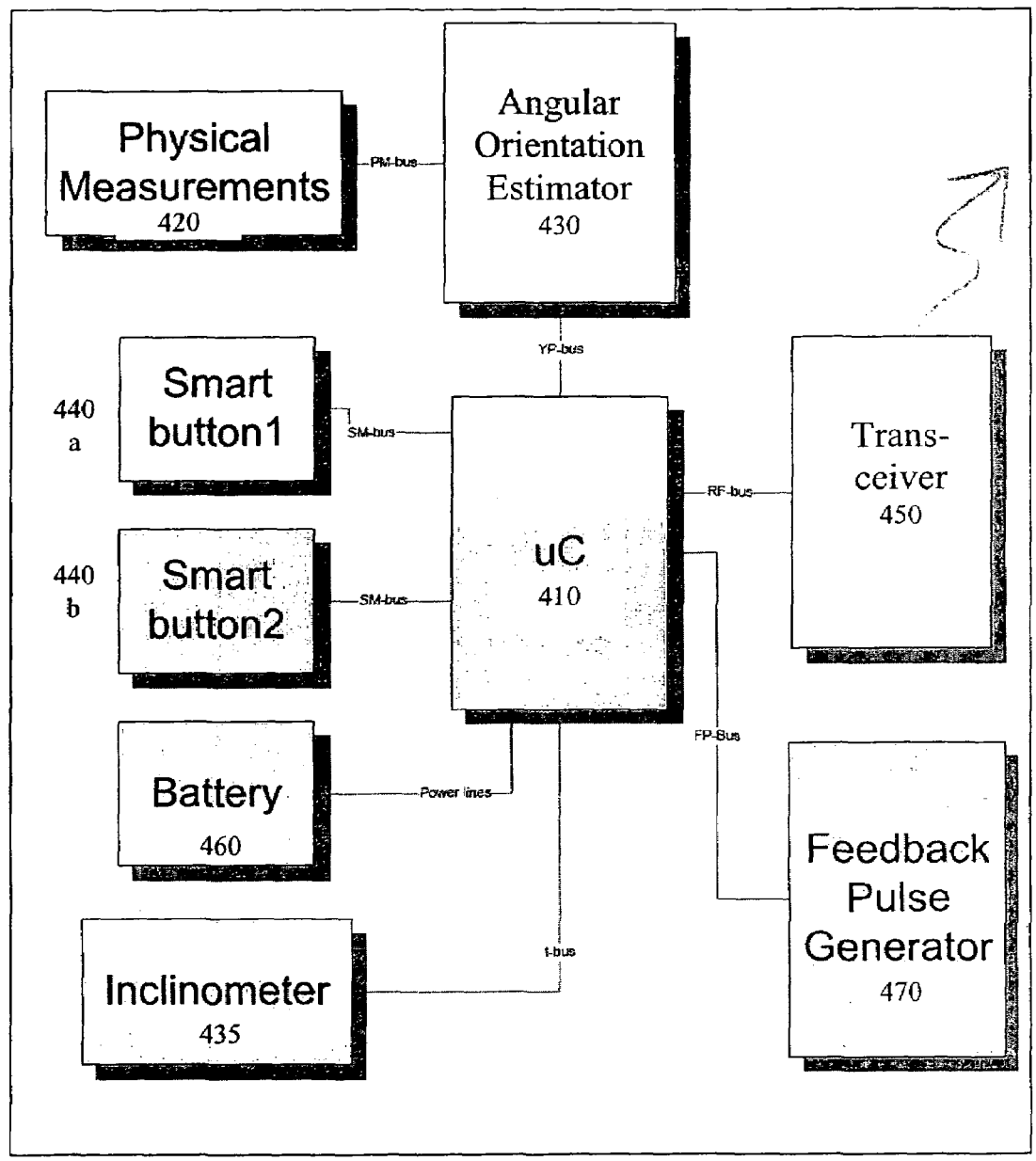
FIG. 4 is a block diagram of a portion of a pointing device in accordance with an embodiment of the present invention.

FIG. 4 is a block diagram of the in-air module 330 in accordance with an embodiment of the present invention. The in-air module 330 comprises a microprocessor 410, a physically measurements module 420, an angular orientation estimator 430, an inclinometer 435, smart buttons 440a and 440b, a transceiver 450, a battery 460, a LED, and a feedback pulse generator 470. These various modules communicate with each other via various buses.

A bus is a set of signals allowing bi-directional data transmission between 2 devices; typically the well known SPI (serial peripheral interface) bus is used. The microprocessor 410 receives the following information from the various buses:

smart button 440 state and pressure over the SB-bus (smart button bus)

angular orientation increment estimations over the YP-bus (yaw pitch bus)

inclinometer measurements over the I-bus (inclinometer bus) (alternatively, the inclinometer functionality can be embedded in blocks 420 and 430)

In one embodiment, the physical measurement block 420 measures pixel intensity values of a 2D sensor "looking" at the scene in front of the device. The block consists of a 2D pixel array (CMOS or CCD), typically 100×100 pixels, a lens producing an image of the scene onto the imager, and interfacing electronics. It will be obvious to one of skill in the art that other methods to detect angular orientation can be used, such as using gyroscopes.

The angular orientation estimator 430 estimates, in one embodiment, the yaw and the pitch by analyzing the data coming from the physical measurement block over the PM-bus. It will be obvious to one of skill in the art that yaw and pitch can be estimated by using one of several algorithms. In one embodiment, yaw and pitch are estimated by an optical flow algorithm developed by Berthold Horn, as described in Horn, B. K. P. & B. G. Schunck, "Determining Optical Flow,"

*Artificial Intelligence*, Vol. 16, No. 1-3, August 1981, pp. 185-203, which is hereby incorporated herein in its entirety.

In one embodiment, the yaw and pitch are estimated by a stand-alone angular orientation estimator module 430, and communicated to the microprocessor. In most such embodiments, estimations of yaw and pitch angles are transmitted in the form of yaw and pitch increments—more precisely the difference of current angle from the angle at the time of the previous readout is transmitted to the microprocessor. In an alternate embodiment, the physical measurement module 420 is connected directly to the microprocessor 410 and the angular orientation estimation is performed by a dedicated routine embedded in the microprocessor code, thus making the separate angular orientation module 430 unnecessary.

The inclinometer 435 measures the orientation of gravity with respect to the inclinometer orientation, and thus indirectly the orientation of the device 200. A typical embodiment is based on a 3-axis accelerometer. While device orientation can be determined from block 430, using a scheme based on gravity orientation is advantageous in one embodiment, as it can deliver in some conditions the absolute orientation with respect to Earth's gravity. Accurate orientation is obtained only when the user-induced acceleration is negligible. This is typically the case when the user is staying still, as is the case when verifying if the user is currently not actively involved with the device. In accordance with one embodiment of the present invention, the information provided by the inclinometer is used to conserve battery life. This is discussed in more detail below.

It is to be noted that re-centering the cursor in free-space mode can be problematic. In a conventional mouse, re-centering can be achieved by simply lifting the mouse and repositioning it at a more convenient location on the work surface. In air, this is not possible. In one embodiment, the device 200 is equipped with an accelerometer. In one embodiment, this accelerometer is part of the inclinometer 435. This accelerometer can detect a sudden fast movement (a jerk) executed by the user. In one embodiment, such a jerk is interpreted as re-centering of the cursor. Thus is one embodiment, the cursor is moved to the center of the display 230 when a jerk is detected. In one embodiment, a jerk is detected by the device when the measured acceleration vector norm or absolute value of any component is larger with some margin than the Earth's gravity. The device sends a notification bit (described below) to the host to indicate that a jerk is detected. When the host receives such a jerk notification, the cursor is recentered.

The microprocessor 410 interprets the angular orientation estimator 430 data, and creates data packets that reflect the desired cursor displacement. Typically, the packet content is the accumulation of all increments read from the angular orientation estimator 430 since the last packet was created. The packets are then output to the transceiver 450 over the RF-bus and then transmitted over the RF channel to the RF receiver. Packets are typically created and transmitted in a periodical way, for example every 8 ms.

The RF receiver connected to the host system 210 receives the packet after transmission. The cursor on the associated display 230 is then moved according to the packet content. The RF transmission scheme is based on popular 27 MHz or 2 GHz transmission schemes. Based on the desired feature set, the RF link is designed to allow bi-directional transmission. In this case, the PC can transmit some configuration data to the device, as needed for example by the angle threshold adjustment when computed on-the-fly (see below).

In its simplest form, the packet transmitted by the transceiver 450 to the host system 210 contains the switch state and the yaw and pitch increment that took place since the previous packet was transmitted. In other embodiment, however, the angular orientation information is scaled according to predefined algorithms, and this in turn changes the resolution of the cursor movement.

In order to understand why/how the scaling occurs, let us turn to the smart buttons 440*a* & 440*b*. As mentioned above, one of the problems with using a device in the in-air mode is the difficulty of clicking on a specified location (e.g., an icon on the display 230). This is because in the in-air mode, cursor movement by design occurs by changes in orientation (and/or location) of the device 200, and it is very difficult for a user to hold the device completely still in mid-air. Moreover, the act of clicking itself creates some parasitic motion, which makes this task even more difficult. In one embodiment, the smart buttons 440 detect when a user is about to click on them, and reduce the resolution of the cursor motion, such that small unintended motions of the users do not cause the cursor to move from the intended location. This facilitates clicking on a specified position on the display 230.

Figure 5:
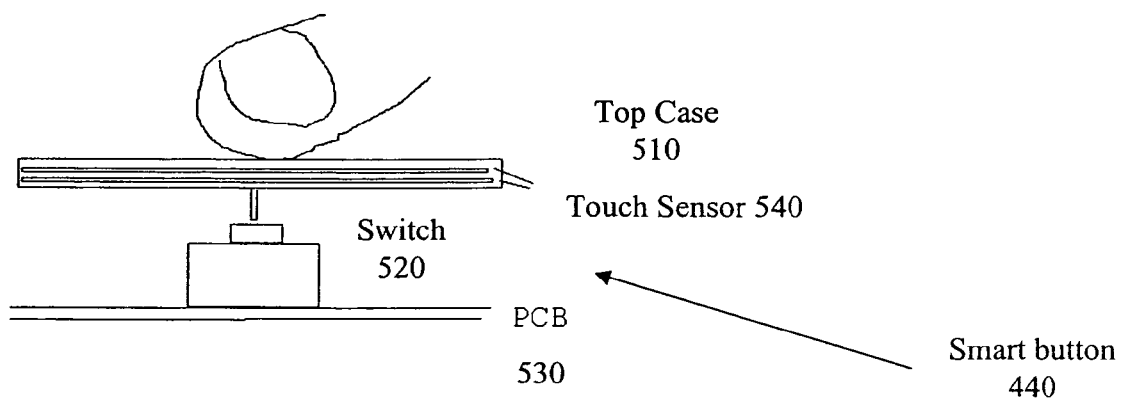
FIG. 5 illustrates a smart button in accordance with an embodiment of the present invention.

FIG. 5 illustrates a smart button 440 in accordance with an embodiment of the present invention. A mechanical switch 520 is mounted on a PCB 530 located inside the device 200. When the switch 520 is pushed, electrical contact is measured, signaling to the microprocessor 410 that the button 440 is effectively activated (corresponding to button state "on"). Above the switch lies the top case 510, on which the user will place his finger and push in order to activate the button 440. In one embodiment, a touch sensor 540 is embedded in the top case 510. In another embodiment, the touch sensor 540 is mounted directly below the top case 510. These touch sensor electrodes 540 serve to detect the presence of the user's finger on the button 440, thus indicating that the user is likely to press the button 440 imminently.

In one embodiment, the smart button 440 detects not only the presence of a user's finger on it, but also the pressure applied by the user's finger to the smart button 440. In one embodiment, the touch sensor 540 consists of a circuit similar to those used in conventional touchpads, such as a 1-D MEP from Synaptics (Santa Clara, Calif.). The touchpad circuit is used to not only detect a finger location on a touchpad, but also to measure finger pressure on a sensitive surface. In some such embodiments, finger location over an extended surface is needed, and multiple electrodes are used. In one embodiment, the touchpad circuit outputs the finger position and pressure. The touch sensor can be implemented using a number of technologies. Examples of such technologies include capacitive sensors, motion detectors, light-level sensors, weight sensors, heat sensors, and infra-red detectors. These technologies can be used alone or in combination effect touch sensor 540. In one embodiment, touch sensor 540 is implemented using the circuitry of a touch pad or touch circuit that senses a user's touch and/or pressure from a finger or stylus. Note that all the circuitry of functionality of a touchpad or tablet need not be employed. Rather, only the components for sensing the presence of a finger and manifesting that presence as an electrical signal are needed.

Thus it can be seen that, in accordance with an embodiment of the present invention, the smart button 440 is the combination of a touchpad sensor and a mechanical switch. The mechanical switch provides a clear mechanical feedback when the button changes state. In one embodiment, the smart button 440 delivers two pieces of information to the microprocessor 410:

Button state (on or off)

Finger Pressure at Button Location (FPBL), which, in one embodiment is a number between 0—min— and 63—max—)

In one embodiment, the mechanical switch is eliminated, in which case it is simulated by defining the smart button 440 as being pushed (that is, the button state being on) whenever the FPBL is above a predefined threshold th_high.

Improved clicking is obtained, in one embodiment, by combining the yaw and pitch increments delivered by the angular orientation estimator 430 with information acquired from the smart button 440. In one embodiment, the desired effect of lowering parasitic and other unintended cursor movement during button 440 activation is obtained by scaling down the yaw and pitch cumulated increments before creating the packet for RF transmission, thus scaling down the overall device resolution by the same amount.

In one embodiment:

processed_increment=estimated_increment*scaling_factor

The variable "estimated_increment" is the value delivered by the angular orientation estimator 430. The variable "processed_increment" is the value used to create the packet for transmission, possibly undergoing an additional non-linear function such as the pointer acceleration settings found in Logitech SetPoint software from Logitech, Inc. (Fremont, Calif.). This feature increases cursor effective resolution on the screen when adequate acceleration is applied to the device. In an alternate embodiment, scaling can be applied after pointer acceleration is performed.

Scaling the resolution by a number scaling_factor smaller than 1 reduces the cursor movement for a given yaw and pitch increment. Indeed, resolution is defined as the ratio of cursor displacement to the actual angular change, expressed in dots per degree. This is similar to the mouse resolution, expressed in dots per inch (dpi).

It is to be noted that, in one embodiment, the scaling operation includes carry-over of division remaining. This allows for keeping accumulation of small increments (smaller than the 1/scaling_factor) rather than eliminating them, hence allowing tracking at low speed and maintaining a more fluid cursor movement.

Figure 6:
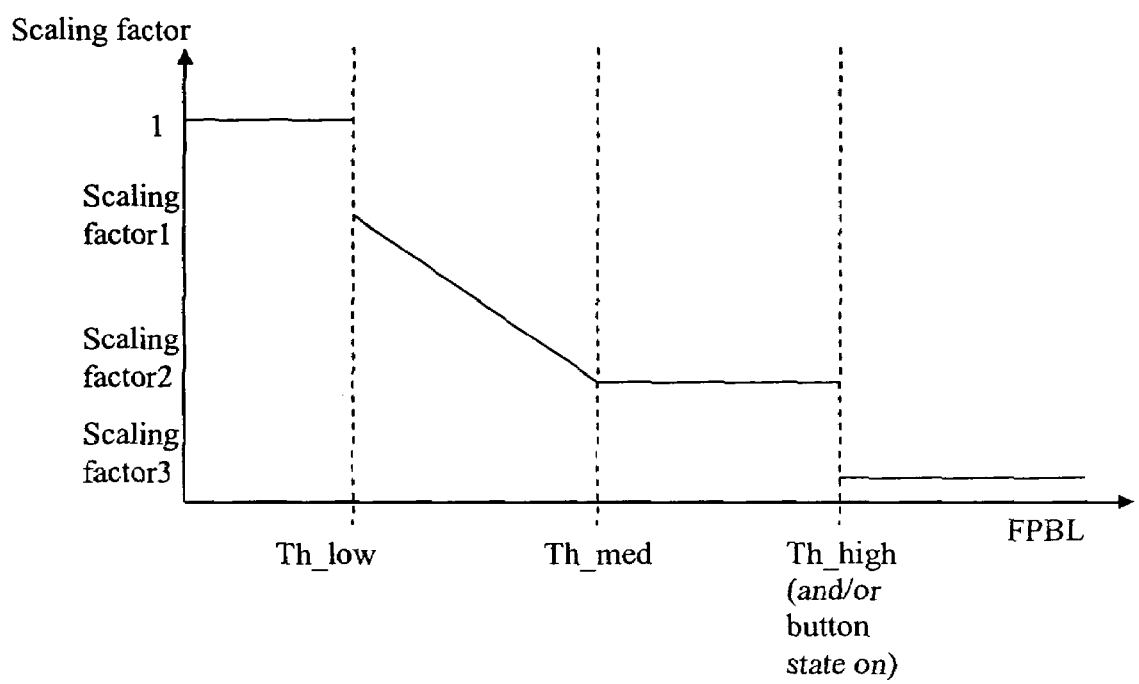
FIG. 6 illustrates the scaling factor plotted against the FPBL in accordance with an embodiment of the present invention.

In one embodiment, the scaling factor applied is not a constant, but rather it varies depending on the FPBL. FIG. 6 illustrates the scaling factor plotted against the FPBL in accordance with an embodiment of the present invention. The graph illustrates how the scaling factor is computed given the instantaneous value of FPBL.

When the FPBL is below the threshold th_low (indicating that no or very low pressure is applied to the smart button 440), the scaling factor is maintained at the value of 1, resulting in no reduction of the resolution.

When the FPBL is above the threshold th_low (indicating that a finger is in contact with the button) but the button state is still off as indicated by the mechanical switch 520, the scaling factor decreases monotonously as the finger pressure is increased, starting from an initial value of scaling_factor1 (for example 25%) down to scaling_factor2 (for example 0%) when a pressure of th_medium is reached. The value th_medium is a pressure at which the mechanical switch 520 is still in its default (not pushed) state. For pressure above th_medium and as long as the switch 520 is not detected as pushed, the scaling factor is maintained at its value scaling_factor2. In an alternate embodiment, if the mechanical switch 520 is eliminated, the higher end of this range may be a predefined threshold th_high.

The next FPBL range is when the smart button 440 is pressed, as indicated by the mechanical switch 520 being pushed, or alternately, as detected by a pressure above th_high when a mechanical switch is not used.

It can be seen from FIG. 6 that during the complete button activation process from finger contact to button being pushed, the device resolution is thus progressively reduced. In the "button pressed" pressure range, and until the button is released, different approaches are possible, including "freeze" or "drag".

In the "freeze" embodiment, the scaling factor in this FPBL range (scaling_factor3) is set to 0. Hence while the button 440 is pressed, the cursor is frozen. This is optimal for icon clicking as no motion occurs between button push and release. It also allows repositioning the hand in a comfortable location without moving the cursor, something equivalent to lifting the mouse to reposition it on the desk. However, in this embodiment, the GUI drag-and-drop functionality is no longer possible.

In the "drag" embodiment, the scaling factor in this FPBL is maintained to a constant value of scaling_factor3 (for example 25%). This allows the user to comfortably drag objects, with a small risk of missing the target (drop) when releasing the switch 520 (parasitic motion at release). It is evaluated that smaller parasitic motion happens at release of switch than at its activation.

In one embodiment, in the "drag" approach, detected yaw and pitch motion can be discarded for the few ms following the click release (for example 200 ms). This allows for more reliable double-clicking.

In one embodiment, as shown in FIG. 4, the device 200 can be equipped with more than one smart button 440. Such smart buttons 40a, 440b, can be used for different purposes, such as one for the principal button (left click) and one for the secondary button (right click).

In a simplest implementation, when no FPBL information is available, the scaling factor is set to 1 when no finger is detected and is set to a value "small_scaling_factor" (for example ⅛) when the finger presence is detected.

Figure 7:
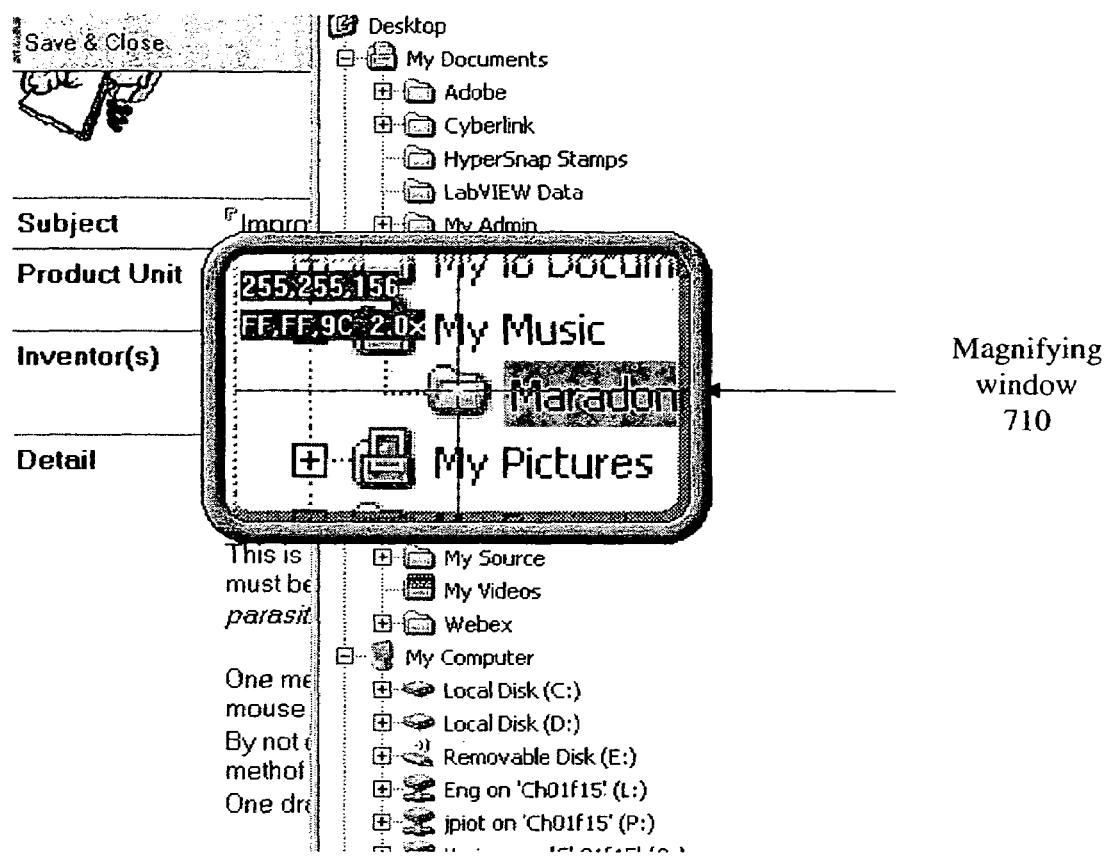
FIG. 7 illustrates a small magnifying window around the cursor in accordance with an embodiment of the present invention.

As shown in FIG. 7, in one embodiment, a smart button 440 launches a small magnifying window 710 around the cursor when the user's finger is detected, thus allowing the user to more clearly see the information proximate to the cursor. This is particularly useful in situations where the screen is further away from the user, such as when the user is in a leaning back posture. In one embodiment, this magnifying window 710 is implemented by using available applications, such as Virtual Magnifying Glass (can be freely downloaded on http://magnifier.sourceforge.net/). In one embodiment, this application can be launched by hitting a specific button. In another embodiment, the device 200 launches this application by having it send a special command over the RF link 102 whenever FPBL is measured to be over a specific threshold (for example, th_low), or when the finger presence is detected.

The combination of magnifying glass and resolution reduction is made more intuitive by enforcing the same magnification factor on the magnifying glass 710 as the resolution reduction factor provided by the smart button 440. For example, a magnification of 4 together with a equivalent resolution reduction of 4 feels natural: a given icon dimension is 4 times larger and the angular increment necessary to cross it on the screen is also 4 times larger.

Extending Battery Life

In accordance with one aspect of the present invention, the power of the battery 460 is conserved. In the case of devices that can operate in air, the user may unintentionally move the device, thus unnecessarily draining the battery. For instance, this could happen when the user is watching a movie or listening to music while holding the device in his hand.

In one embodiment, it is determined whether or not the user is actively controlling the cursor. If it is determined that the user is actively controlling the cursor, then the device 200 remains in a state of high power consumption. If, however, it is determined that the user is not actively controlling the cursor, then the device 200 is placed in a lower power state (for example, the idle state).

In one embodiment, the information provided by the inclinometer 435 is used to make the current state determination. The inclinometer 235 continually provides the microprocessor 410 the inclination of the device 200. Inclination is defined by the direction of gravity in spherical coordinates in the reference frame defined by the device 200.

In one embodiment, the 2 angles in spherical coordinates, namely longitude (theta) and co-latitude (phi) form the inclination vector; radius of gravity vector is constantly 1G while standing still. At system initialization, the reference inclination is defined to be [theta[1], phi[1]], that is the first 2 measurements of angles:

[theta_ref, phi_ref]=[theta[1], phi[1]]

At measurement n (made at time n*T_mon, where T_mon is the monitoring period, for example 8 ms), if the absolute value of inclination difference is measured to be larger than a predefined threshold angle th_angle, the inclination reference is replaced by the current inclination [theta[n], phi[n]]:

if abs(theta[n]−theta_ref)>th_angle or abs(phi[n]−phi_ref)>th_angle then [theta_ref, phi_ref]=[theta[n], phi[n]]

end

This is repeated over time, so that whenever abs(theta−theta_ref)>th_angle or abs(phi−phi_ref)>th_angle, the reference inclination is replaced by the currently measured inclination. In one embodiment, instead of "ORing" (OR operator) the theta and phi comparison outcomes, a single comparison based on the norm of [theta, phi] vector can be used. In another embodiment, a non-linear function can be used instead of abs(·). In one embodiment, when the microprocessor 410 detects that inclination reference is not being updated for more than a pre-defined duration timeout1 (for example 1 minute), the device enters the idle state.

In one embodiment, in the idle state the polling rate of the inclinometer is reduced (for example 100 ms) and several of the modules shown in FIG. 4 are (for instance those needed to control the cursor) are disabled. This effectively reduces battery consumption when the device is not actively used for cursor control.

In one embodiment, as soon as the reference inclination needs to be updated (due to an inclination change larger than th_angle), the device 200 goes back in active mode. All modules are powered back and polling rate for inclination monitoring is increased back to its high polling rate.

In one embodiment, when the device is placed in a low power state, for example the idle state, the uC turns off the one or more LEDs, thus indicating to the user that in-air tracking is currently disabled. In this embodiment, the device then turns on the LEDs (controlled from the uC 410) when the device is in active mode. In one embodiment, the LEDs are also used for the dead front functionality and indicate the device is being operated as an in-air device. Alternatively, a LED is used in a conventional manner to indicate that in-air tracking is activated. Allowing the user to know when the device is active or inactive helps extending battery life as the user can adapt his usage model based on the LED indication.

In one embodiment, a third mode of operation, called sleep here, can be implemented, in which an even larger polling rate for inclination monitoring is applied, for example 800 ms. This translates into an even lower battery consumption but at a cost of an increased latency for switching the device 200 back to the higher power state. In one embodiment, the sleep mode is entered when the device is in idle for more than a duration timeout2 (for example 10 minutes).

Figure 8A:
FIG. 8A shows a UI controlling screen resolution via a slider.
Figure 8B:
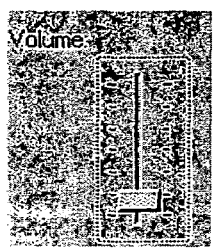
FIG. 8B shows a UI controlling volume via a slider.
Figure 8C:
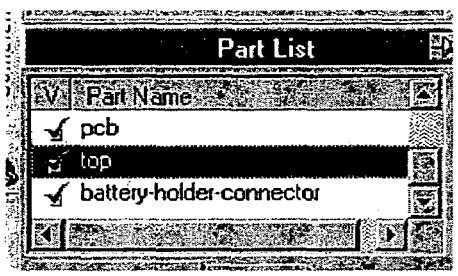
FIG. 8C shows a list box UI.
Figure 8D:
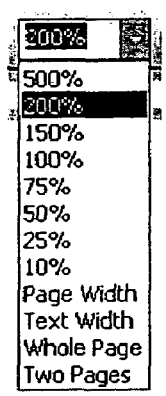
FIG. 8D shows a pop-up menu UI for changing zoom.
Figure 8E:
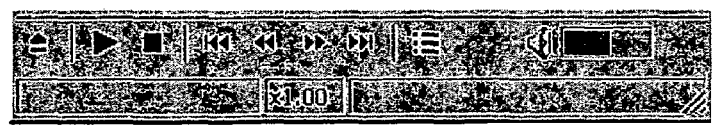
FIG. 8E shows a button group UI for playing media content.
Figure 8F:
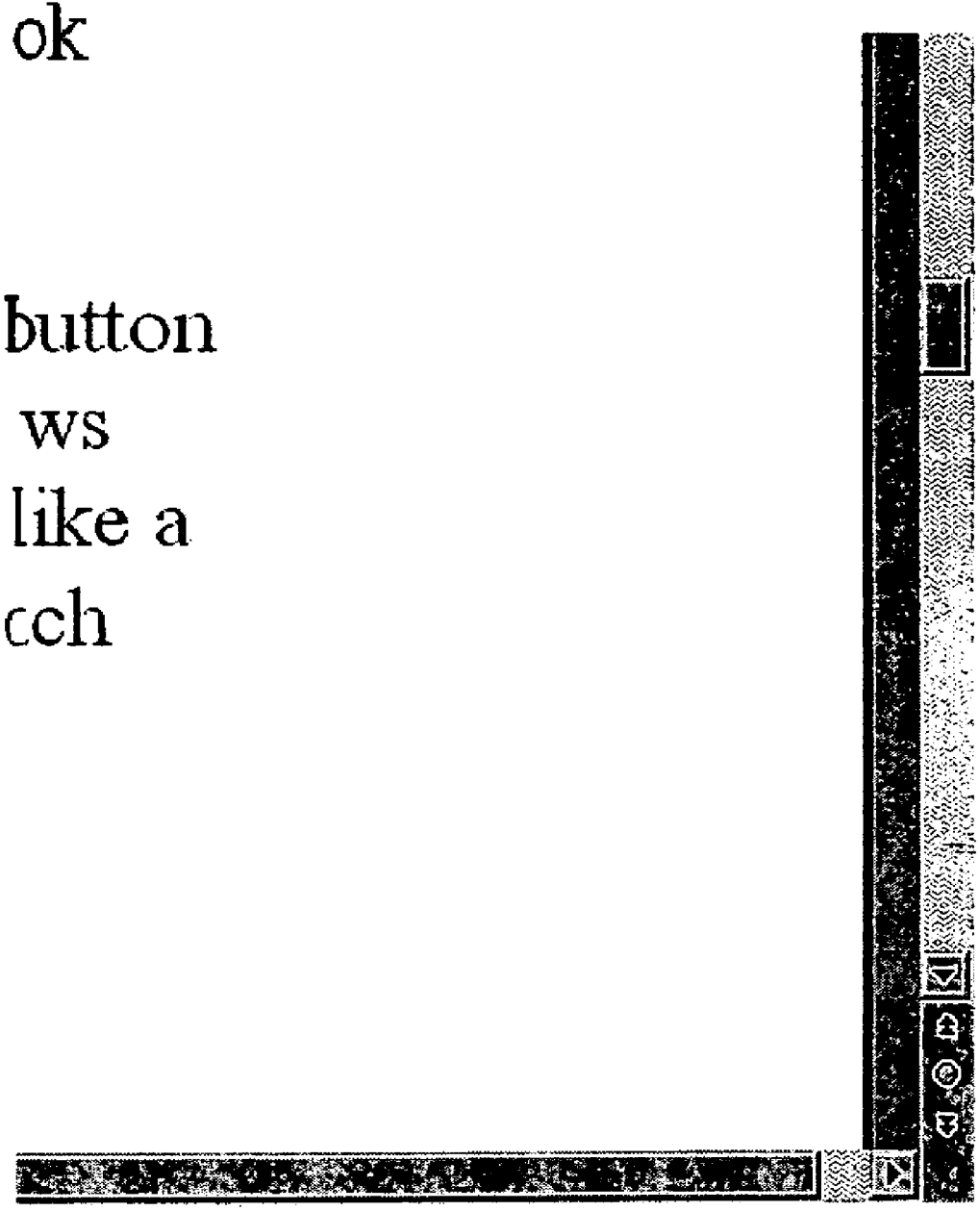
FIG. 8F shows a vertical slider UI used for scrolling.

Air-control In accordance with one aspect of the present invention, UI controls defined by well-known GUI guidelines include, among others, slider, list box, pop-up menu, button group can be controlled in an easy an intuitive way when the device 200 is operating in the in-air mode. FIGS. 8A-F provide examples of such UI controls. In particular, FIG. 8A shows how screen resolution can be changed via a slider. FIG. 8B shows how volume can be controlled via a slider (vertical slider UI control). FIG. 8C shows a list box. FIG. 8D shows a pop-up menu for changing zoom. FIG. 8E shows a button group for playing media content. FIG. 8F shows a vertical slider used for scrolling, and is used as the basis for the discussion below. It is to be noted that although the example of a vertical slider is used for the following discussion, the discussion applies equally well to other UI controls (such as those indicated in FIGS. 8A-8E) as well. Further, in the discussion below, the UI control is a slider moving vertically. It is to be noted that the discussion is also applicable to a horizontal slider. While UI control describes a generic GUI item, it must be understood that the user is ultimately interested in the functionality associated with this UI control and not the control per se. For example, FIG. 8B shows a slider control, but the user is really interested in its functionality, namely altering the sound volume. Each of the below described UI controls are uniquely associated to a fixed functionality and thus UI controls and their underlying functionality can be interchanged in the text. Equivalently, when the functionality is covered by standard commands, such as those offered in Human Interface Device (HID), the UI controls and their corresponding HID (or Logitech HID++ extension) commands can be interchanged in the text that follows. For example moving a volume slider up can be interchanged with sending the HID command "Volume Increment". Similarly, if air-control for a given functionality is desired (for example "Zoom up/down"), a UI control adapted to this functionality can be defined, such as a zoom slider.

In one embodiment of the present invention, a pre-defined UI control with a pre-defined functionality is associated with a dedicated button on the device, called dedicated_button1. In one embodiment, dedicated_button1 is a smart button 440 as described above. In another embodiment, dedicated_button1 is a conventional button on an input device. In one embodiment, the mapping of a device 200 button to a UI control (equivalently its underlying functionality or equivalently its HID/HID++ command) is defined in a setup program such as the mouse dialog box. The association of a dedicated button to a UI control can take place in the host low-level mouse application, such as Logitech SetPoint from Logitech, Inc. (Fremont, Calif.), and effectively directs all events linked to activation of the button directly to the control (as long as the mapping is active).

In another embodiment, the association can be first defined in a configuration dialog box, and then programmed in a non volatile way into the device using the bi-directional RF link. In this case, the association would stay active even without a special application running in the PC. This is useful for presentation device where the user is away from his personal system and can not control the presentation display with his low-level mouse application.

In another embodiment, programming can take place by changing entirely or in part the program that runs the device microprocessor 410. For example, the association can consist of translating some button activation with a new pre-defined command, as for example "volume increment", or a keyboard character that is further going to control an application. For example, when the keyboard sends the letter "b", the screen is blanked with PowerPoint from Microsoft Corp. (Redmond, Wash.). Reprogramming can redirect a button activation into a keyboard transmission of the letter "b" or an equivalent HID command, thus allowing to program screen "blanking" merely by pushing a button on the device. By programming the association in the device with a dedicated program, the feature is available on any computer that is controlled by the device, even without an application SW such as SetPoint.

In one embodiment, when the user pushes dedicated_button1, a slider appears in a modal dialog box. As long as the button is maintained pushed, the user is in air-control mode. In this embodiment, no interactions other than those applicable to the UI control are possible until the button is released, at which time the slider disappears.

In one embodiment, the user can click or double-click the dedicated button to start interacting with the control which appears in a non-modal dialog box. Clicking again or double clicking again will have the effect of validating and exiting the control. In one embodiment, when the user pushes dedicated_button1, a slider is selected among the many UI controls present on the screen.

In one embodiment, the air-control is directed to one of the many UI controls of a media control application, for example volume, zoom, pan. In a native mode of operation, three dedicated buttons allow direct air-control of volume, zoom, and pan.

In another embodiment, air-control consists of sending direct HID commands instead of controlling a graphical UI. For example, "volume increment", "volume decrement", "zoom up", or "zoom down" can be issued instead of controlling a volume slider position up or down.

This mode can be analogized to an automated scrolling mode in some conventional mice (e.g., some mice from Logitech, Inc. (Fremont, Calif.)), where, after pressing a dedicated button (e.g., a button under a scroll wheel), the mouse can be moved up or down to scroll up or down respectively in a document. In such an automated scrolling mode, the user does not need to move the cursor to the vertical scrolling bar in the document. Similarly, in the air-control mode, the slider which appears or is selected upon pressing the button can be controlled by the user by simply changing the device orientation (e.g., pitch).

In one embodiment, when the device 200 is in air-control mode, the user is provided with feedback regarding the changes in the orientation of the device, thus informing the user that his intended control will be executed as desired. This provides the same level of improved usability as that offered by a mechanical switch where switch activation is intuitively confirmed by the noise and vibration provided by the switch mechanism. Referring back to FIG. 4, it can be seen that in one embodiment, the microprocessor 410 controls the feedback pulse generator 470 via the FP-bus. In one embodiment, the feedback pulse generator 470 produces vibrations consisting of one single pulse. In another embodiment, the feedback pulse generator 470 generates a combination of multiple pulses closely packed together, perceived by the user as a single pulse and thus counting as a single feedback pulse event. In the case of multiple pulses packed together, the number of pulses and their period is determined based on subjective criteria and also matched to the actuator in use. The feedback pulse can be audio, visual, tactile, or a combination of any of these. In one embodiment, the feedback pulse generator 470 is a simple buzzer. In another embodiment, it is a small loudspeaker playing sound sequences either prerecorded in the memory of microprocessor 410 or computed on-the-fly by the microprocessor 410. In yet another embodiment, it is a solenoid. In another embodiment, it is a combination of one of the former with a short change of light intensity from the LED that is being activated while in the active mode.

As mentioned above, in one embodiment, while the device 200 is in active mode, the microprocessor 410 reads, in the main tracking subroutine, the increment of yaw and pitch estimates from the angular orientation estimator 430 and accumulates these increments for the purpose of a RF packet creation. In one embodiment, in the air-control mode, another accumulator, called button1_accumulator, is maintained in another register (accumulating yaw if slider is horizontal and accumulating pitch if slider is vertical) in the same subroutine. When dedicated_button1 is being pushed, the value of button1_accumulator is set to 0. While dedicated_button1 is maintained pushed, pitch increments (for the vertical slider) are accumulated into button1_accumulator.

Whenever the register button1_accumulator is equal or larger than a threshold value th_feedback, the microprocessor 410 subtracts th_feedback from the register content and a feedback pulse is generated by applying the appropriate command over the FB-bus. In one embodiment, the feedback pulse is generated by toggling the line that drives the buzzer.

For example, if the estimator resolution is 20 increments per degree and if th_feedback is 40, a feedback pulse will be generated every time the user increases the yaw (or pitch) angle by 2° while maintaining dedicated_button1 pushed.

Apart from providing the user with feedback, in the air-control mode, the device 200 also sends a notification event to the UI control in the host system requesting execution of the action desired by the user. In one embodiment, the device 200 sends a HID report that describes the desired effect, such as "Volume Increment" or "Volume Decrement" when a dedicated air-control button, assigned to volume control, is pushed and the device orientation is changed up or down.

In another embodiment, as described above, a transmission packet from the device 200 to the host system 210 consists firstly of the detected yaw/pitch increments, the states of various buttons, including air-control dedicated buttons, and also the FPBL for smart buttons. In addition, for air-control functionality, some numbers of status bits are included as well in one embodiment. In one embodiment, notification bits "ControlUp" and "ControlDown" are embedded in the RF packet to be sent from the device 200 to the host system 210, which serves as a trigger for the transmission of the packet. By knowing which dedicated_button is being pressed while receiving these notification bits, the host can determine which functionality is affected by notification bits "ControlUp" or "ControlDown". For example, if the dedicated_button assigned to volume control is pushed, and if the notification bit "ControlUp" is asserted, the host will understand that the user is requesting a volume increment and will in turn increase the sound volume.

In an alternate embodiment, in air-control mode, the yaw and pitch increments transmitted in the packet are set to 0 (discarded) and only the "ControlUp" (or "ControlDown") event or the equivalent HID command is transmitted to the UI control. This amounts to freezing the cursor during air-control button navigation. Cursor movement will then resume after the button is released. In one embodiment, the cursor is frozen during air-control but the cumulated increment values while in air-control are eventually transmitted in one or more RF packet at end of the air-control. This locates back the cursor to a position that more closely-matches that of the hand. Since the device orientation was changed during air-control, the cursor resume, at end of air-control, to a position more aligned with the current device orientation.

In one embodiment, when the "ControlUp" (or "ControlDown") event is sent to the UI control associated with the currently pressed dedicated_button in the host system 210, the UI control is updated by repositioning the slider to its new location as defined after a feedback pulse is emitted. If the UI control is a list box, successive items in the list get highlighted as successive "ControlUP/Down" notifications are sent. If the UI control is a button group, the successive buttons in the group get highlighted. Similar control visual update happens for the pop-up menu.

In another embodiment, the feedback pulse is triggered by the host system 210 (rather than being generated directly by the device 200 itself), and the trigger signal is transmitted back to the device 200 via the bidirectional link 202. In one such embodiment, the feedback pulse can serve as an indication to the user that the desired action has been taken. In one embodiment, triggering is performed by the host issuing a HID notification such as "FeedbackPulse" (as such a report is not defined natively in HID class definition, a format extension such HID++ defined by Logitech can be used)

In one embodiment, when dedicated_button1 is released, the air-control mode is exited. The UI control disappears or is disengaged and normal cursor control resumes. In some embodiments, when applicable, UI controls such as button group, list box, and pop-up menu activate the selected effect or item when the air-control mode is exited. For example, let us imagine a "Media" UI control consisting of a list box of 3 items, arranged vertically. The items are, from top to bottom to top "Movie", "Music", and "Photos", with "Music" initially the initial default value. The list box appears when pushing the button associated with the Media UI control ("Media button"), the middle "Music" item being highlighted. The user increases the pitch angle until a feedback pulse is activated. Jointly with the feedback pulse, the "ControlUp" notification event is sent by the device 200 to the UI control in the host system 210, the latter is updated by highlighting the top item "Movie" The user then no longer moves the device. Eventually, the user releases the button with the top item still highlighted (selected). The Media UI control disappears and the top item "Movie" process is started.

Another example is a button group for controlling the playing of audio or video (tape transport functionality). The button group may include the following set of buttons arranged horizontally: "Eject", "Play", "Stop", "Previous", "Next", "Backward", "Forward" (see FIG. 8E). Assuming the player is stopped initially, pressing the button (transport button) dedicated to this UI control will display this button group with "Stop" initially highlighted (there would be no effect if device button was immediately released). Imagine that the user then moves the device 200 to the left until he hears a feedback pulse. At this instant, the "ControlDown" notification event is sent by the device 200 to the UI control in the host system 210, which is updated by highlighting the "Play" button. The user then no longer moves the device, and eventually releases the transport button with the "Play" item still highlighted (selected). The transport UI control disappears and the media player starts the "Play" process.

In one embodiment, slider UI controls are activated at every "ControlUp" (or "ControlDown") notification. For example, a volume slider as shown in FIG. 8B and its underlying functionality are updated on-the-fly every time a feedback pulse and notification occurs. In one embodiment, no special process is started when the button dedicated to this UI control is released.

In one embodiment, the UI is not shown on the screen while in air-control mode. The user then relies entirely on the feedback pulse to evaluate when the yaw or pitch increment is sufficient to obtain the desired result.

It is to be noted that a slider can be either horizontal or vertical. As discussed above in detail, a dedicated button can be defined to control the scroll functionality (either horizontal or vertical) of the application in focus. In this case, the device 200 in the in-air mode behaves just like a roller wheel in a conventional mouse: a feedback pulse is generated every time the user increments yaw or pitch by, say, 2° a notification is sent and the text get scrolled by a defined number of lines. In this embodiment, the feedback pulse mimics the ratchet mechanical feedback built into the roller wheel of a conventional mouse. As with the volume slider case, the threshold crossing effect is immediate (e.g. notification and scrolling occurs immediately whenever the feedback pulse is perceived).

In one embodiment, jerk detection can also be used to further enhance air-control when set for a scroll functionality. Jerk detection engages the auto-scroll feature, in which scroll-down or scroll-up is activated at constant speed until the dedicated button for scroll is released. The speed and direction of auto-scroll are determined based on acceleration direction at jerk, scrolling direction at jerk instant, and user taste.

Since scrolling is by nature two-dimensional—scrolling to the left/right or up/down—and since the device allows to read two-dimensional controls, air scrolling can be applied to scroll document simultaneously left/right and up/down by expanding the one-dimensional description above to the two-dimensional case. For this purpose, two accumulators need to be allocated for the dedicated button associated to two-dimensional scroll. A feedback pulse is generated when either a horizontal or a vertical angular change of a defined magnitude is detected. A pulse feedback notification is applied for each pulse instance. The same 2D pulse feedback and notification mechanism can be applied to a 2D list box or a 2D button group.

In one embodiment, reuse of readily available keyboard commands allows for an immediate backward compatibility with existing applications. For example, in Microsoft Windows, it is possible to use the four "Arrow" keys available on the keyboard (Up, Down, Left, Right) to navigate through a list of items, for example a list of files, of applications, of music songs, or through menu lists. The driver for the pointing device fools the application into thinking it is seeing a command from a keyboard, for example an arrow command. Applications to which this can be applied include "File Explorer", the "Start" application launcher (using the "Start" icon on the task bar), music library exploration in "Media Player", and drop-down menus existing in most Windows applications. All mentioned applications implement such a keyboard control as an alternative to the point and click mouse model. Once a given list has the focus—e.g. is activated by the mouse primary click—, hitting the key "Up Arrow" or "Down Arrow" on the keyboard will select the successive, respectively previous, item in the list. Similarly, "Right Arrow" or "Left Arrow" further allow to expand or collapse a sub-tree of folders, application groups, or navigate up or down through sub-menus from a hierarchical menu list. In the embodiment described here, a dedicated button provides "arrow air-control" to all the UI control, including but not limited to list boxes, drop-down menu, that are natively controlled by the keyboard Arrow keys. This embodiment replaces dedicated notification mechanism such as asserting notification bits "Control Up" described above by a generic keyboard "Key Up" command. This requires the Pointing Device 200 to be recognized not only as a mouse but also as a keyboard. Since mouse and keyboard can both select an item in any of the lists described above, the described embodiment can either select an item directly using the point and click mechanism (mouse mode) or by hitting the "arrow air-control" while further controlling yaw and pitch until the angular increment generates a the necessary keyboard equivalent Arrow command (keyboard mode).

In one embodiment, the keyboard control mode is further expanded by allowing the pointing device 200 to issue "Enter" keys commands when it is desired to activate an item that is currently selected in the list. With a keyboard, this can be done by the "Enter" key in many applications. In "file explorer", hitting the keyboard key "Enter" (carriage return) will launch the application associated with the file type of the selected item. In a menu, "Enter" will execute the code described in the selected menu item. In the "Start" menu, hitting the "Enter" key will launch the selected application. In one arrow air-control embodiment, after selecting an item with the arrow dedicated button, a short secondary press, occurring after its release, will result in the Pointing Device 200 issuing an "Enter" key command thus activating the selected item. In one embodiment, the arrow air-control usage involves a first push of dedicated button (and further device yaw/pitch control) to select an item, possibly in hierarchical sub-lists; when selection is established, the button is released. A secondary push then activates the selection.

In one embodiment, the keyboard control mode is further expanded by having the pointing device 200 issue an "Escape" keys commands when it is desired to remove some or all the sub-lists such as sub-tree, or sub-menu created during navigation. This is shown in the following example. Imagine the user has clicked on the "Start" button. The list of available application and application groups opens up as a list. The user then pushes and maintains pushed the button offering "arrow air-control". He then moves up the list (using air-control positive pitch increments to create "Key up" commands) until the "Programs" item (a program group in this example) is highlighted. In order to expand the programs available in the group "Programs", the user moves to the right with the "arrow air-control" button still held pushed. All subsequent up/down air-control affect now this sub-list having "Programs" as origin node. If the button "arrow air-control" is released at this stage, the hierarchical list and sub-list remain displayed, with the last selected item still highlighted, waiting for the user to further navigate or start a program (as would occur with a subsequent short push of arrow dedicated button). In one embodiment, if no secondary press occurs on the "arrow air-control" button within a defined time window (for example 0.5 second), the system understands that the user does not intend to further launch any one of the available applications. The Pointing Device 200 will issue "Escape" key command to cancel and erase some or all the opened lists. In the example above, 2 lists are created, one after clicking on "Start" and one after moving right ("Key Right") when the Programs group was selected for further navigation. In one embodiment, when it is determined that the user is not further pursuing the launch of an application, the number of successive "Escape Key" is determined so that all the displayed lists are canceled (here 2). This number is the result of a running sum of 1 plus the number of "Key Right" minus the number of "Key Left" that were sent from the moment on the "arrow air-control" is pushed until it is released for longer than the defined time window. In one embodiment, a single "Escape key" is also issued which follows immediately the "Key Left" after the user has moved on the left with the dedicated button still pressed, thereby moving up by one level in the hierarchical menu.

In one embodiment, providing the focus to the desired UI control is obtained by pressing the primary mouse button while the cursor is located over the UI control as is done in normal mouse usage. In one embodiment, pressing the dedicated button associated to arrow air-control triggers a sequence of events "button pressed" followed by "button released" of the primary mouse button (left button). In this manner, pressing down the dedicated button effectively mimics a primary mouse button press and release. The user needs only to have the cursor located over the desired UI control and then press the arrow dedicated button and maintain it pressed to further interact with it. This embodiment allows interacting with most UI controls (lists, drop down menus, etc) with a single dedicated button.

In one embodiment, the arrow air-control involves a dedicated button, for example labeled "Menu", and allows direct air-control of selection/activation on existing Windows systems without any dedicated application programmed in the host, thus offering arrow air-control natively.

In one embodiment, the volume air-control involves a dedicated button, for example labeled "Vol", and allows direct air-control of sound volume on existing Windows systems without any dedicated application programmed in the host, thus offering volume air-control natively.

In one embodiment, the zoom air-control involves a dedicated button, for example labeled "Zoom", and allows direct air-control of zoom functionality on existing Windows systems without any dedicated application programmed in the host, thus offering zoom air-control natively.

In one embodiment, the scroll air-control involves a dedicated button, for example labeled "Scroll", and allows direct air-control of scroll functionality on existing Windows systems without any dedicated application programmed in the host, thus offering scroll air-control natively.

In one embodiment, the angle threshold necessary to trigger a feedback pulse (th_feedback) can be programmed from the host 210 as defined below. This allows to configure the air-control resolution. The purpose of adjusting resolution is to achieve adequate control of the UI control for different applications. For instance, providing only 2 feedback pulses for the whole slider travel may be insufficient for a volume control application. A volume control having for example 255 possible values would need to balance precision and controllable range without regripping the device. A possible trade-off would be to trigger a feedback pulse every 2°, and to increase the slider value by 10 when redrawing the control after a pulse notification event. Another trade-off would allow a better resolution on volume control (for example increase slider value by 1 instead of 10 every time a 2° angular change is detected) but over a smaller range of volume of 30 control steps (the angular span of the user hand is by nature limited to a known range, for example +30° to −30° off a mid-range position). On the other hand, a UI control consisting of a 4 items list box covering half the screen height could be programmed to apply a 5° angle threshold for a more comfortable control. In one embodiment, the UI control specification will determine the required angle threshold which is transmitted by the host to the device 200 via the bi-directional RF link 202. This configuration is applied independently for each dedicated_button.

In one embodiment, the direction (up/down, left/right, or both for two-dimensional air-control) of air-control is programmable. In one embodiment, the feedback mode and feedback strength is programmable. For example, mode can be sound feedback, light feedback, none, or both. In one embodiment, the air-control functionality can be disabled, in which case, the dedicated button is used as a regular button. In all cases, programming the device is done by the host 210 after the system configuration and the desired active UI controls are defined. Programming is achieved by updating configuration registers in the memory of uC 410. The host communicates the required values for the configuration registers by sending them over the bi-directional RF link. For example, a HID++ report is sent by the host 210 to the device to transmit the desired device configuration. HID++ is an extension of HID allowing new report definitions.

Figure 9A:
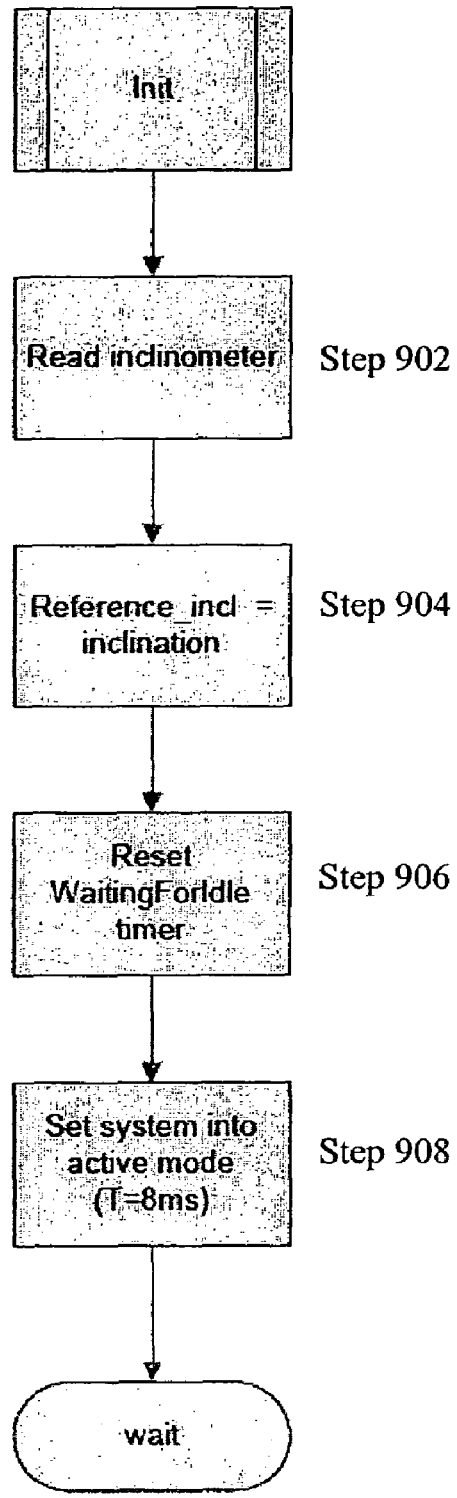
FIG. 9A is a flowchart illustrating an initialization process in accordance with an embodiment of the present invention.
Figure 9B:
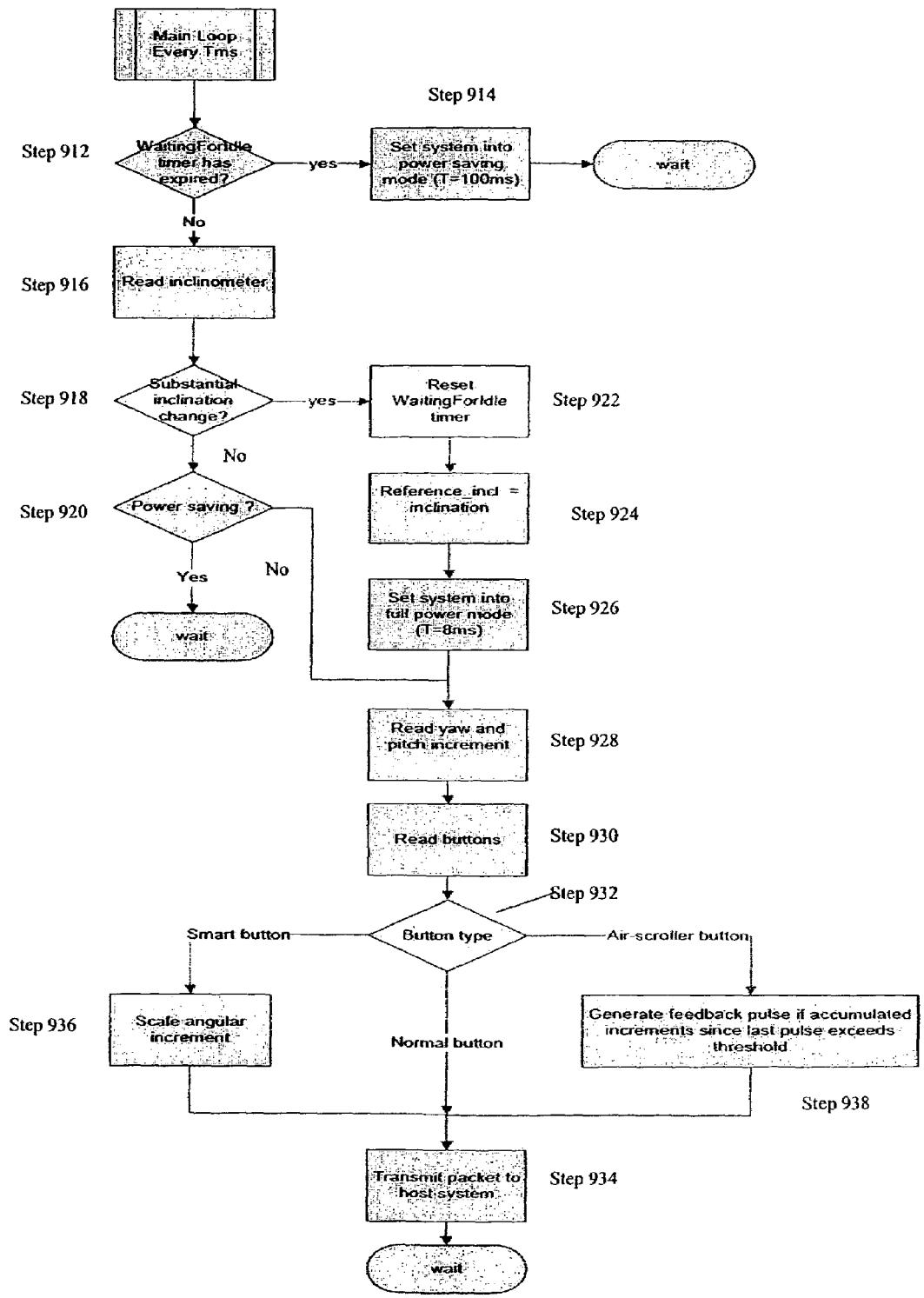
FIG. 9B is a flowchart illustrating a process followed after initialization, in accordance with an embodiment of the present invention.

FIGS. 9A and 9B are flowcharts that provide an example of the functioning of a device 200 in accordance with an embodiment of the present invention. FIG. 9A is a flowchart that illustrates an initialization process, while FIG. 9B is a flowchart illustrating a process followed after initialization in accordance with an embodiment of the present invention.

As can be seen from FIG. 9A, in one embodiment of the present invention, initialization begins with reading (step 902) the inclinometer 435. A variable Reference_incl is set (step 904) to the inclination read. A timer called WaitingForIdle is reset (step 906). The system is then set into active mode (step 908). The repeat time is defined for the periodical routine: making T=8 ms in one embodiment results in the main loop being called every 8 ms. This sets up the rate at which the main loop is being called.

After the initialization process is complete, the main loop is called every T ms, as can be seen in FIG. 9B. The system checks (step 912) to see whether the WaitingForIdle timer has expired. If it has expired, the device is set (step 914) to the power saving mode for a specified amount of time. In one embodiment, this time can be 100 ms. If the WaitingForIdle timer has not expired, the inclinometer 435 is read (step 916). The system checks (step 918) to see whether there has been a substantial inclination change. If there has not been a substantial inclination change, the system checks (step 920) whether the device 200 is already in power saving mode. If the device is in power saving mode, the system waits.

Referring again to step 918, if there is a substantial change in inclination, then the WaitingForIdle timer is reset (step 922). The variable Reference_incl is then set (step 924) to the current inclination. The system is set (step 926) into full power mode for a specified time period. In one embodiment, this time period is 8 ms. The yaw and pitch increments are then read/calculated (step 928) as described above. The buttons on the device 200 that are useable in the air-control mode are also read (step 930). If a button is found to be activated, the type of button activated is determined (step 932). If a normal button is activated, a transmission packet including the angular increments is sent (step 934) to the host 210. If a smart button is activated, the angular increments are scaled appropriately (step 936) as described above, prior to transmission (step 934) of the packet to the host 210. If an air-control button is activated, a feedback pulse and associated notification are generated (step 938) if accumulated increments since last pulse exceeds the threshold as described above, in addition to transmitting (step 934) the packet to the host 210. While processing of only one single button is shown in the flow chart, a multi-buttons device will implement the button processing independently for each button.

While particular embodiments and applications of the present invention have been illustrated and described, it is to be understood that the invention is not limited to the precise construction and components disclosed herein. For example, the device can be used to control the TV channel on a new type of television set on which a GUI is available. Channel scrolling is implemented for example with help of a list box. The dedicated button linked to this UI, when pressed, allows one to intuitively "scroll" through the various channel. The list box may even not need to be visible since the pulse feedback suffice to perceive the "next channel" notification. This advantageously replaces the "channel +/−" button found on most remote controller. Various other modifications, changes, and variations which will be apparent to those skilled in the art may be made in the arrangement, operation and details of the method and apparatus of the present invention disclosed herein, without departing from the spirit and scope of the invention as defined in the following claims.

What is claimed is:

1. A method for improved cursor control using a pointing device for controlling a cursor on a display associated with a host, the pointing device including at least one button, the method comprising:
    calculating a change in displacement of the pointing device;
    determining whether a user's finger is placed on the button;
    responsive to the determination that the user's finger is placed on the button, scaling the change in displacement of the pointing device;
    transmitting the scaled change in displacement of the pointing device to the host;
    wherein the step of scaling comprises:
    measuring the pressure exerted by the user's finger on the button;
    responsive to the pressure being less than a first threshold, using a first scaling factor; and
    responsive to the pressure being greater than the first threshold and less than a second threshold, using a scaling factor monotonically decreasing with an increasing measured pressure.

2. The method of claim 1, wherein the step of transmitting comprises:
    including the scaled displacement in a transmission packet;
    wirelessly transmitting the transmission packet to a receiver communicatively coupled to the host.

3. The method of claim 1 further comprising:
    responsive to pressure being greater than a second threshold, using a second scaling factor;
    wherein the first threshold is less than the second threshold, and the first scaling factor is greater than the second factor.

4. The method of claim 3 wherein the cursor is frozen above said second threshold.

* * * * *